United States Patent [19]

Kumar et al.

[11] 4,260,582

[45] Apr. 7, 1981

[54] DIFFERENTIAL EXPANSION VOLUME COMPACTION

[75] Inventors: Kaplesh Kumar, Wellesley; Dilip K. Das, Bedford, both of Mass.

[73] Assignee: The Charles Stark Draper Laboratory, Inc., Cambridge, Mass.

[21] Appl. No.: 58,530

[22] Filed: Jul. 18, 1979

[51] Int. Cl.[3] .................... B29C 1/00

[52] U.S. Cl. .................... 264/111; 264/109

[58] Field of Search .................... 264/111, 109

[56] References Cited

U.S. PATENT DOCUMENTS

| | | | |
|---|---|---|---|
| Re. 28,301 | 1/1975 | Havel | 75/223 |
| 3,279,917 | 11/1963 | Ballard et al. | 75/226 |
| 3,284,195 | 6/1966 | Googin et al. | 75/226 |
| 3,383,208 | 5/1968 | Correl | 75/214 |
| 3,441,392 | 4/1969 | Direcha | 29/182.8 |
| 3,622,313 | 11/1971 | Havel | 75/226 |
| 3,656,946 | 4/1972 | Inque et al. | 75/226 |
| 3,671,230 | 6/1972 | Smythe et al. | 75/213 |
| 3,676,079 | 7/1972 | Morgan | 23/345 |
| 3,689,259 | 9/1972 | Hailey | 175/226 |
| 3,992,200 | 11/1976 | Chandhok | 75/211 |
| 3,992,202 | 11/1976 | Dulis et al. | 75/222 |
| 4,000,235 | 12/1976 | Leemput | 264/109 |
| 4,041,123 | 8/1977 | Lange et al. | 264/332 |
| 4,065,302 | 12/1977 | Turillon | 75/208 |
| 4,104,782 | 8/1978 | Veeck et al. | 29/527 |
| 4,108,652 | 8/1978 | Ogawa et al. | 75/223 |
| 4,142,888 | 3/1979 | Rosmus | 264/111 |

OTHER PUBLICATIONS

Dilip, K. Das. "Differential Expansion Diffusion Couple Welding Device", Review of Scientific Inst., vol. 29, No. 1, p. 70, Jan., 1958.

*Primary Examiner*—Donald E. Czaja
*Assistant Examiner*—James R. Hall
*Attorney, Agent, or Firm*—Weingarten, Maxham & Schurgin

[57] ABSTRACT

Method and apparatus for the formation of a molded article from powders and powder compacts of a material by pressure compaction of the powders under the influence of a thermally driven differential volume expansion of first and second elements constraining the powders. The volume expansion achieves a trippling of the compaction effect.

14 Claims, 8 Drawing Figures

FIG. 1
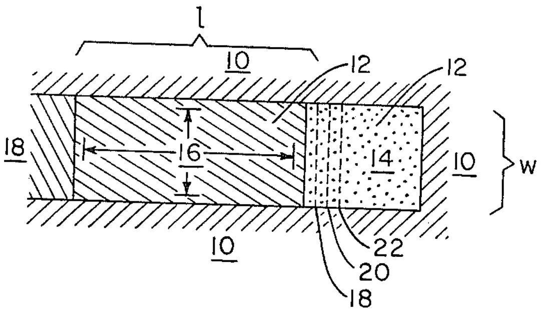
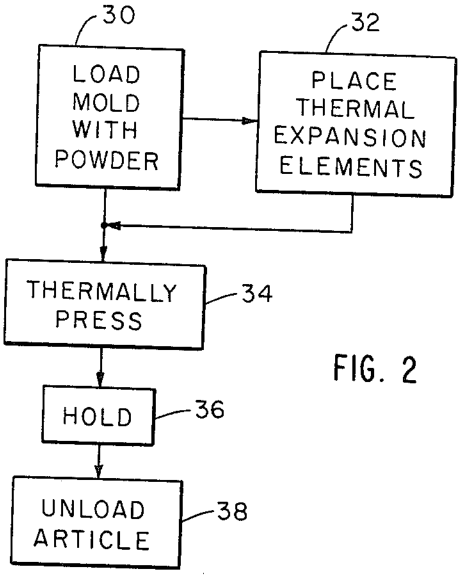
FIG. 2
FIG. 3
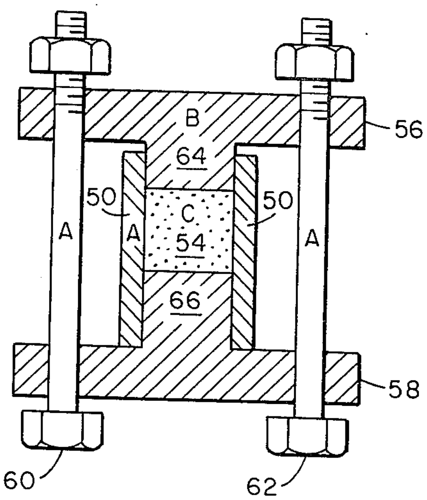
FIG. 5
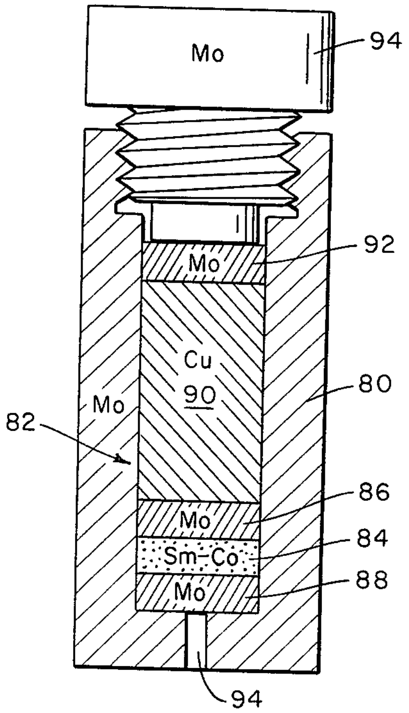
FIG. 4
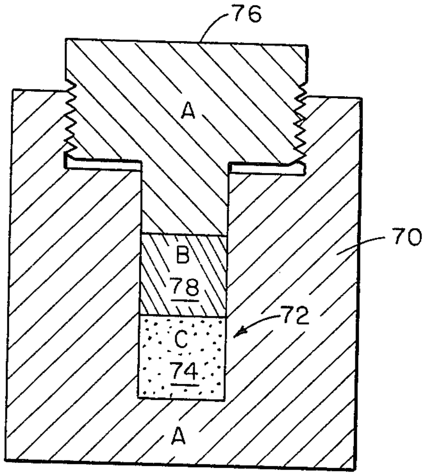

DIFFERENTIAL EXPANSION VOLUME COMPACTION

FIELD OF THE INVENTION

The present invention relates to the formation of articles by compaction of powders.

BACKGROUND OF THE INVENTION

The formation of molded articles from powders and powder compacts of metals or ceramic has previously been achieved by techniques of sintering or by pressing, including hot pressing or hot-isostatic pressing. The sintering technique has the disadvantage of requiring a high temperature for the sintering effect to proceed. The resulting article typically exhibits a large grain structure which inhibits the development of maximum strength in the article. The alternative approaches of hot pressing or hot-isostatic pressing typically entail batch processing of a limited number of articles which involves a substantial cost. In the former technique each mold must be individually compressed by mechanical means in a vacuum or inert atmosphere. In addition the mechanical pressing technique can only achieve a uniaxial force due to the directionality of the mechanical press. In the latter, or hot-isostatic pressing, technique some cost savings are available since pressure is applied atmospherically. Also multiaxial compression is provided. But the technique requires the additional expense of sealing the powder compacts in outgassed, evacuated metal cans before the application of pressure by the build up of gas pressure at elevated temperatures. The molded article must also be removed by expensive and time consuming machining or acid etch techniques.

SUMMARY OF THE INVENTION

The present invention contemplates method and apparatus for the formation of a pressure compacted article from powders of a material and the article so formed in which the compression is achieved within a mold by a differential in total volume thermal expansion characteristics of different portions of the mold as the temperature of the mold is changed. Temperature is varied over a range sufficient to form the required compaction of the powders. A ductile material having a high thermal expansion is used to compress the compact. The mold body is configured around this material constraining it except in the direction of compression so that the volume expansion can be converted into a trippling of the compression on the volume of the compact.

Typically the mold comprises a metallic body structure of a first material having a relatively low coefficient of thermal expansion and in which a cavity has been formed, a portion of which may or may not be the female or mold counterpart of the article to be formed and in which portion powders of a material of which the article is to be manufactured is placed. On one or more or all sides of the powder is placed a ductile material having a coefficient of thermal expansion substantially greater than that of the mold body and having a volume in the mold body sufficient to produce a compressive force on the powders from its volume expansion to compact them into the desired article at a temperature typcially below the sintering temperature for the powders. The extent of compression is governed by the ratio of the volumes of the ductile material to the compact and this can be very high.

This technique of metal powder molding using a volume expansion effect in accordance with the present invention has the advantages of achieving a high density article approaching that of the theoretical 100% density at low temperatures, those which may be no more than 100°-200° C., and lower than those needed for sintering these powders. Such low temperatures avoid the grain growth characteristic of compaction by sintering, since sintering typically proceeds at the elevated temperatures which encourage grain growth.

Additionally, molding in accordance with the present invention can proceed more cost effectively by eliminating the need for individual external electromechanical contact for pressing or the use of controlled environments as is the case with the former hot or hot-isostatic pressing techniques. The mold fixture may also be used repeatedly to avoid the high cost of refixturing for each article which is needed in the case of hot isostatic pressing where the container is lost. Finally, the thermal expansion compaction technique lends itself readily to control over the axes of compressive force application by proper tailoring of the mold and location of the high expansion material surrounding the powder compact.

BRIEF DESCRIPTION OF THE DRAWING

These and other features of the present invention are more fully set forth below in the solely exemplary detailed description and accompanying drawing of which:

FIG. 1 is a generalized schematic view of apparatus in accordance with the present invention;

FIG. 2 is a flow chart illustrative of the steps of article formation in accordance with the present invention;

FIGS. 3-8 are sectional views of several typical molds employing the volume expansion effect useful in forming articles in accordance with the present invention.

DETAILED DESCRIPTION

Figure 6:
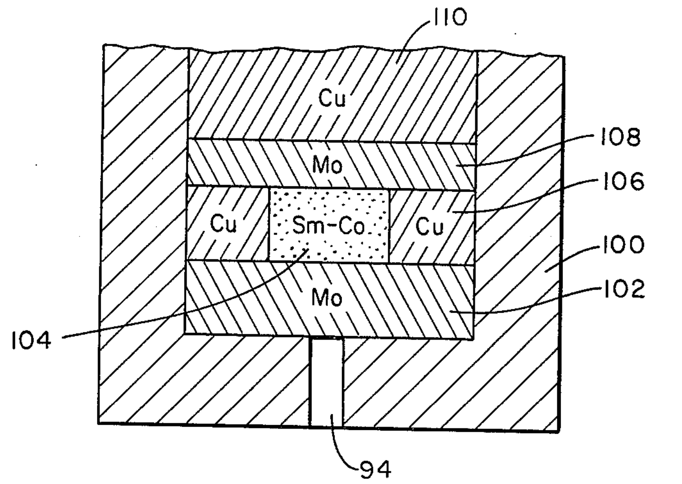

The present invention generally makes use of the difference in volume expansion between materials of different thermal expansion characteristics. The materials are formed as integral components of a mold for the pressure formation of articles from powder compacts. The volume effect amplifies the total compression by a factor of three over linear expansion effects.

A conceptualization of the invention is illustrated in FIG. 1 in which a mold 10 contains a cavity 12 partially filled with a powder compact 14 from which the ultimate article of the product is formed by pressure molding. The remainder of the cavity 12 is filled with a material 16 having a relatively high thermal expansion. The cavity is then sealed at the opposite end by a plug 18. The entire cavity is filled with either compact 14 or expansion material 16. The mold 10 is preferably fabricated of a low thermal expansion material with a high yield strength while expansion material 16 has a high thermal expansion characteristic and a relatively low yield strength to particularly at the compression temperatures involved). An example of a set of materials which satisfy this condition is molybdenum for the mold 10 and copper for the expansion material 16.

As is illustrated in the processing flow diagram of FIG. 2, and taken in conjunction with FIG. 1 the mold 10 is loaded with a charge of powder compact 14 in the cavity 12 in an initial load step 30. The thermal expansion element 16 is added to the mold 10 and the mold is plugged in a step 32. The fully loaded and secured mold is then thermally activiated such as by heating to an elevated temperature in a step 34 resulting in the thermal expansion of the element 16 relative to the other elements of the mold and compression of the powder within the volume 12 to form the solid article desired. The elevated temperture is maintained for a predetermined period as indicated in a step 36 before the thermal cycling is completed by reducing the temperature and unloading the article in a step 38.

The molding technique of the present invention achieves a trippling of the compression effect by utilization of the expansion of material 16 in all directions, i.e. the three orthogonal axes. A two dimensional sectional representation of this is illustrated by reference to FIG. 1, assuming that the difference in thermal expansion between mold 10 and element 16 is "a" per unit length. The element 16 will expand linearly al to line 18 where l is the horizontal length in the FIG. 1 view. It will also expand aw in thickness where w is the element 16 thickness assuming a square cross section. Thickness expansion is prevented by the mold confinement, so that the element 16 instead deforms, elastically and/or plastically, to line 20 for one thickness dimension and to line 22 for the other thickness dimension.

Viewing the expansion as a volume effect, the expansion in the l direction produces a volume expansion of al times the end area, $w^2$, to achieve an $alw^2$ added volume. Each thickness expansion adds a volume equal to aw times the side area, wl, to produce an awlw or $alw^2$ expansion. Thus the total expansion is $3alw^2$, a trippling of the linear expansion, all directed toward compressing compact 14 under the flow of element 16.

The element 16 is suitably dimensioned to have, a volume relative to the volume of compact 14, to produce the desired compression of the compact 14 at the elevated temperature. There thus exists a tradeoff between the degrees of temperature rise and the volume of the element 16 in order to achieve the desired compression. The actual temperature to which the powder is heated and held in steps 34 and 36 is therefore within the control of the user based upon the properties of the pressed article desired. For example, in the use of certain powders such as samarium cobalt representative of a class of useful compacts characterized by rare-earth/transition metal combinations, the temperature utilized for compaction may be kept well below the temperature at which sintering effects occur. Grain size is thus kept small and the strength of the ultimately produced article will be increased. Ceramics may also be compressed in this manner with controlled temperature.

In the example noted above the low expansion elements of the mold 10 are fabricated of molybdenum while the high thermal expansion element 16 is fabricated of copper. It is possible to use many other materials as well, using the rule that the high expansion element such as copper element 16 have a flow characteristic at reasonably low temperatures while the mold 10 have a far lower relative expansion characteristic and possess less or no flow at the compacting temperature.

Figure 7:
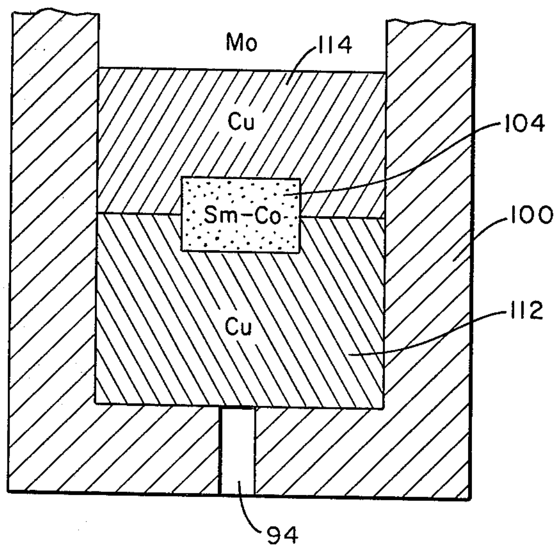

Molds designed to provide powder compaction in accordance with the present invention may utilize uniaxial or multiple-axial compression. FIGS. 3–5, and 8 illustrate molds in which uniaxial compression is provided while FIGS. 6 and 7 show multiaxial compression. In FIG. 3 a mold is provided inside a low thermal expansion cylinder 50 which borders and constrain a volume 54 adapted to hold powdered material to be compacted and fabricated into a desired article. Top and bottom plates 56 and 58 are adapted to be secured in facing a relationship through bolts 60 and 62 to hold protrusions 64 and 66 on plates 56 and 58 respectively against the volume 54 of powdered material. The bolts 60 and 62 and cylinder 50 are typically formed of a low thermal expansion material such as molybdenum while the end plates 56 and 58, and in particular the protrusions 64 and 66, are formed of a high thermal expansion material such as copper. The powder facing portions of cylinder 50 and the protrusions 64 and 66 may be configured in accordance with the surface form desired in the final, molded article. In this and the other molds, foil of, for example, molybdenum may be placed between the copper and compact in volume 54 to prevent chemical reaction between the materials as needed. After compaction the cooled mold and compact retract from each other and are readily separated.

A modified mold is illustrated in FIG. 4 showing a mold block 70 having a cavity 72 the bottom of which defines a volume 74 for the powder compact of which the final article is to be manufactured. The block 70 is sealed at the top by a screw cap 76 after the insertion of a plunger 78 in the cavity 72 to occupy the space between the screw cap 76 and volume 74. Typically the mold block 70 and screw cap 76 are both fabricated of a low thermal expansion material such as molybdenum while the thermally expanding plunger 78 is fabricated of a high expansion material such as copper. The block 70 forms a lateral support for the plunger 78 which, as indicated above, facilitates the generation of a uniaxial force on the volume 74 by converting lateral expansion into additional length expansion through plastic deformation of the copper plunger 78.

FIG. 5 shows a modification of the mold configuration of FIG. 4 in which a mold block 80 is provided with an elongated cavity 82 in which a volume 84 for the powder compact is formed between lateral portions of the block 80 and top and bottom slugs 86 and 88. Above the top slug 86 is located an elongated plunger 90 which is restrained vertically by a further slug 92 and mold screw cap 94. Typically the mold block 80, slugs 86, 88 and slug 92, and the cap 94 are all fabricated of a low thermal expansion material such as molybdenum while the thermally expanding plunger 90 is fabricated of copper. The slugs may, however, be of high expansion material as well. By isolating the volume 84 and plunger 90 with slugs 86, 88 and 92 chemical reaction between the compact and the copper plunger is avoided. An aperture 94 is utilized for outgassing of the mold contents during heating.

FIGS. 6 and 7 illustrate forms of the invention in which the volume expansion effect is employed for providing multi-axial compression on a compact. As shown in FIG. 6 a mold 100 is formed substantially as illustrated above of a low expansion high strength material such as molybdenum. A molybdenum slug 102 is placed in the bottom of the mold to provide a high strength removable bottom form for a compact 104 placed above the slug 102 and surrounded by a copper annular collar 106. Above the compact 104 and collar 106 a further molybdenum slug 108 is provided to define the top surface shape for the compact 104. Above the slug 108 is placed a copper plunger 110 which is secured within the mold 100 by any convenient means such as those illustrated above. During compression, when the mold and contents are heated to the desired temperature, not only does the plunger 110 expand downwardly with the triple volume effect compressing both the compact 104 and the collar 106, but the collar 106 itself expands in three dimensions, but by constraint between the slugs 102, 108 and mold 100 is forced to direct its expansion radially inward on the compact 104. Thus both vertical and radial compression is applied to the compact 104. The flow characteristics of the copper collar 106 are used to convert the downward pressure of the plunger 110 into both downward and radial compression on the compact 104. The additional thermal expansion provided by the copper collar 106 adds additional compression to the compact 104.

FIG. 7 illustrates a modified version of the FIG. 6 compression mold in which two copper blocks 112 and 114 are shaped to fit within the cavity of mold 100 and are further apertured at their facing surfaces with cavities to receive the compact 104. The upper copper block 114 is vertically restrained within the mold 100 by further molybdenum or other material as desired. The thermal expansion of the blocks 112 and 114 is again concentrated into a compression on the compact 104. The very high ratio in volume between that of copper blocks 112 and 114 and the volume of the compact 104 produces a substantial amplification in the compressive force on the compact 104. Indeed it may be desirable to produce a compression on the compact 104 resulting from the expansion of the copper blocks 112 and 114 which exceeds the desired or feasible compression on the compact 104. The flow properties of the copper blocks 112 and 114 may then be utilized to regulate the degree of compression by permitting the copper to flow as through the aperture 94 utilized to permit insertion of the elements into the mold 100. This self regulating effect may also be achieved by using a slug of a specific material having a known flow point in terms of temperature and/or pressure thereby producing a well defined compression limitation upon the compact being compressed.

Figure 8:
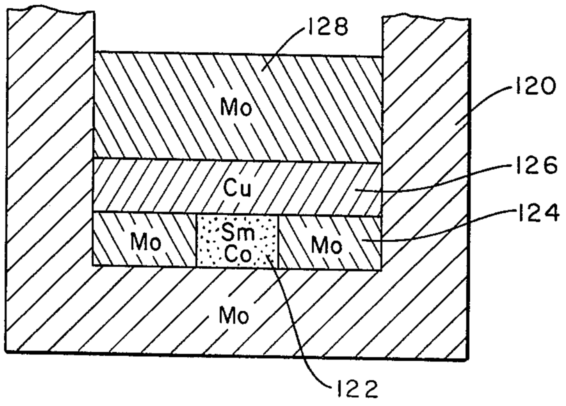

FIG. 8 illustrates a further example of the application of the present invention to a volume expansion compression. In this case, a mold 120 is provided in the cavity of which a compact 122 is placed surrounded by a collar 124 of low expansion high strength material such as that utilized in forming the mold 120. Directly above the compact 122 and collar 124 is placed a thin disc 126 of high expansion material capped off with a restraint 128 of low expansion material. Even though the high expansion disc 126 is substantially thin its total volume is increased by its lateral extent thereby producing a substantially high ratio in volume between disc 126 and compact 122. Because the disc 126 possesses a flow characteristic at the temperature and pressures employed, its volume expansion can be directed downwardly within the cnetral aperature of the collar 124 against the compact 122.

As indicated above, foils of a material may be employed to separate elements of the mold cavity which would otherwise react with each other and to further facilitate the separation of the mold elements after the thermal compression step. Also as indicated above different materials from those given in the examples above may be employed for the high and low thermal expansion materials respectively. In this regard, and to some extent, a low strength, low expansion material may nevertheless be used for the mold body if a sufficient thickness is used to reduce the chances of its fracturing or otherwise dislocating. It should additionally be clear that the embodiments discussed above are exemplary only, other forms of practicing the invention being clearly anticipated as falling within its scope as defined in the following claims.

What is claimed is:

1. A process for the formation of high density pressed parts comprising:

subjecting a volume of particulate material which is to be formed into a pressure molded shape to a compressive, article producing force produced by thermal expansion of an expandible element; and constraining said element against expansion except toward said material to produce amplification of the compressive force on said material by flow of said element.

2. The process of claim 1 wherein said particulate material includes a mixture of rare-earth and transition metal powders.

3. The process of claim 2 wherein said particulate material includes samarium and cobalt powder.

4. The process of claim 1 wherein said constraining step includes confining said element within a mold cavity.

5. The process of claim 4 wherein the step of subjecting said material to a compressive force includes the step of heating said element and said material, said element having a thermal expansion coefficient and ductility higher than said mold.

6. A process for the formation of a molded article from powders of a material comprising:

constraining of volume of said powders of said material within a mold against an element having a thermal expansion characteristic differing from that of said mold;

changing the temperature of said element over a range to a temperature which, as a result of the difference in volume thermal expansion of said mold and said element causes compression of said powders; and maintaining said temperature for a predetermined interval to produce a compression formed article.

7. The process of claim 6 wherein said element has a coefficient of thermal expansion greater than that of said mold and said temperature is an elevated temperature.

8. The process of claim 6 wherein said powders comprise metallic powders.

9. The process of claim 6 wherein said powders are powders of a ceramic.

10. The process of claim 6 wherein said predetermined temperature is an elevated temperature below the sintering temperature for the powders in said volume.

11. The process of claim 6 wherein said compression is uniaxial.

12. The process of claim 6 wherein said compression is multi-axial.

13. The process of claim 6 further including the step of limiting the compression on said powders.

14. The process of claim 6 wherein said limiting step includes compressing said powders against a material which plastically flows at a predetermined compression.

* * * * *

UNITED STATES PATENT AND TRADEMARK OFFICE

CERTIFICATE OF CORRECTION

PATENT NO. : 4,260,582

DATED : April 7, 1981

INVENTOR(S) : Kaplesh Kumar, et al

It is certified that error appears in the above—identified patent and that said Letters Patent is hereby corrected as shown below:

| | | |
|---|---|---|
| Column 2, | line 68, | "activiated" should read--activated--. |
| Column 3, | line 5, | "temperture" should read --temperature--. |
| Column 5, | line 52, | "cnetral" should read --central--. |
| Column 6, | line 11, | "element; and" should read --element;--. |

Signed and Sealed this

*Tenth* Day of *November 1981*

[SEAL]

*Attest:*

GERALD J. MOSSINGHOFF

*Attesting Officer* *Commissioner of Patents and Trademarks*